Jan. 17, 1956   R. P. POWERS   2,731,064
TIRE AND RIM
Filed Sept. 29, 1954
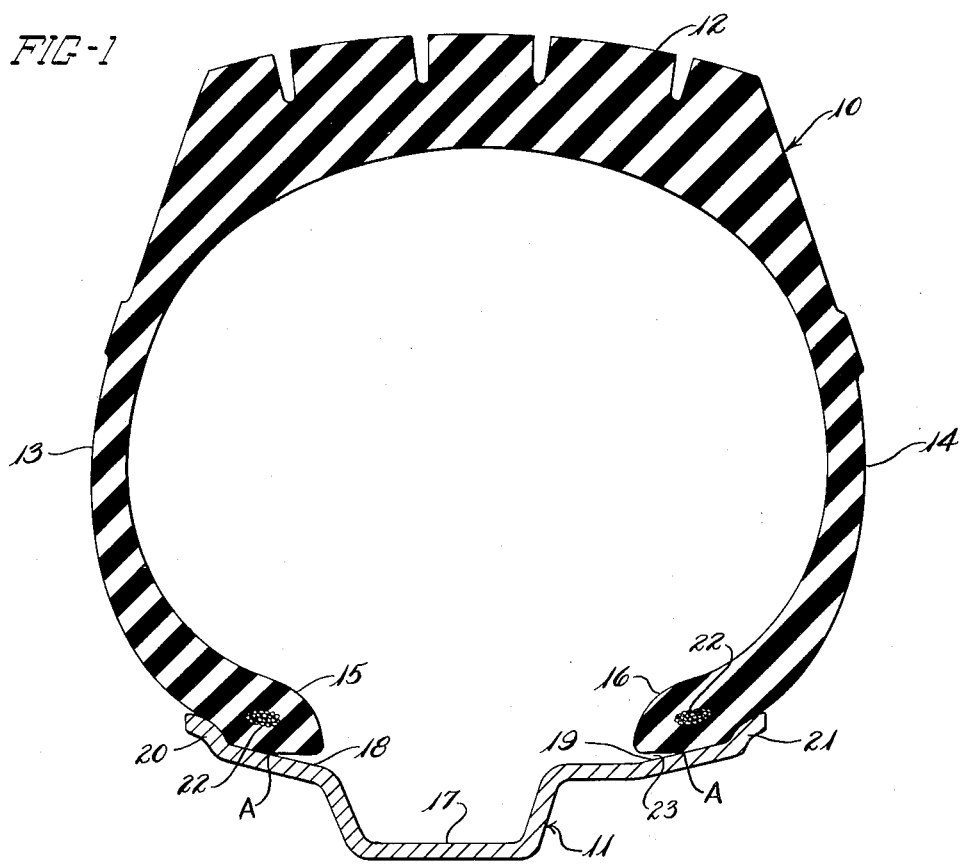
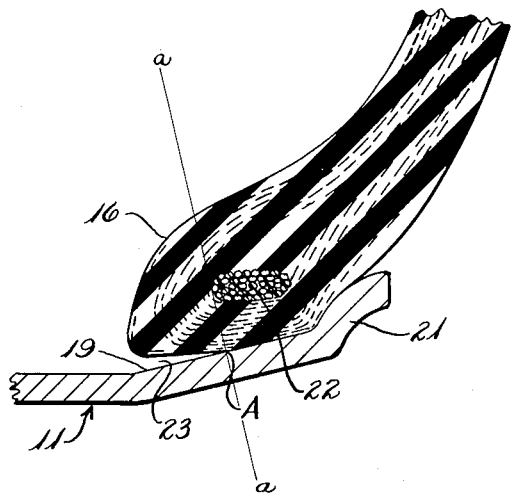
INVENTOR.
ROBERT P. POWERS
BY W. A. Fraser
ATTY.

United States Patent Office 2,731,064
Patented Jan. 17, 1956

2,731,064
TIRE AND RIM

Robert P. Powers, Akron, Ohio, assignor to The Firestone Tire & Rubber Company, Akron, Ohio, a corporation of Ohio Application September 29, 1954, Serial No. 459,130

1 Claim. (Cl. 152—378)

This invention relates to improvements in tires and more particularly to an improved bead construction for tubeless tires.

In my co-pending application, Serial No. 337,158, filed February 16, 1953, an improved drop-center rim is disclosed which is characterized by annular tire bead seats which are radically tapered so that the tire is supported in large part by the reaction of the tire beads with the bead seats rather than by the reaction of the tire bead with the rim flanges. When a tire is mounted on such a rim and inflated, a tire bead transmits two sets of forces to the rim, an axial set of forces which is sustained by the reaction of the tire bead with the rim seat and with the side flange of the rim and a radial set of forces which is supported by the bead seat of the rim. Moreover these forces are transmitted to the rim almost entirely by the bundle of wires comprising the core of the bead, the core being forced axially outwardly against the rim flange and also being compressed tightly upon the rim seat by these combined forces. The result is that the forces of reaction between the rim and the tire bead are concentrated, in great measure, to the heel portions directly beneath and axially outwardly of the core of the bead; only a minor fraction of the forces is sustained by the toe portion of the bead which is located axially inwardly of the bead core. Thus, the heel portion of the bead tends to be locked securely in place on the rim by the forces of reaction, while in contrast, the toe portion of the bead which transmits little force to the rim, is not locked in place but rather tends to move on the rim as the inflated tire rotates and flexes under load. The toe portion of a tire bead, therefore, tends to chafe, producing a severe abrasion of the tire bead, which, if it is severe enough, will wear through the outer plies of the tire where they are wrapped around the bead core. Such abrasion will weaken the tire and, in a tubeless tire as soon as the abrasion exposes the first ply of the tire, air will then wick along the ply cords and collect in the form of bubbles between the plies. Ply separations and failure of the tire follow.

The present invention solves this problem of bead abrasion by providing a bead of such shape that it transmits relatively large forces to the rim at every point of its contact with the rim. This is accomplished by lifting the toe portion of the tire bead completely out of contact with the rim and thereby concentrating the forces at the heel of the tire. As a result, the tire bead is securely locked in place on the rim and there is accordingly no tendency for the bead to move on the rim. Chafing and abrasion is virtually eliminated. The load carrying capacity of the tire bead remains undiminished.

The invention thus follows a practice which is entirely contrary to that accepted by tire designers in the industry today. The problem of chafing of the beads of a tire has long plagued tire designers but in every case they have sought to mold the toe portion to give it a compression fit with the tire bead seats in an effort to hold the toe on the rim. Such attempts have met with mixed success and where the conditions are severe, have been unsatisfactory. On the contrary the present invention, by taking this novel and radical approach to the problem, has met with unexpected and surprising success.

An object of the present invention, therefore, is to provide a tire bead which will not chafe when seated on a rim because the entire area of contact with the rim effectively transmits relatively large forces to the rim.

Another object is to provide a tire bead for truck tires and the like in which its contact with a rim is confined to an area which is located substantially outward of the core of the bead.

A more specific object is to provide a truck bead so shaped as to lift the toe portion of the bead out of contact with the rim during normal operation of the tire.

These and further objects and advantages will be more fully apparent from the following description of a preferred form of the invention, reference being had to the accompanying drawing in which:

Figure 1 is a sectional view taken in a radial plane of a truck tire embodying the invention mounted on a drop-center rim; and Figure 2 is a fragmentary view on an enlarged scale showing one of the beads of Figure 1.

The invention is described with reference to a 10-ply truck tire indicated generally at 10 which is shown mounted on a drop-center rim indicated at 11. Except for the construction of the beads the tire 10 is conventional, comprising the usual tread portion 12, sidewalls 13 and 14 and beads 15 and 16. The rim is similar to that described in my co-pending application, referred to above, and comprises a drop-center well portion 17, tire bead seats 18 and 19 and side flanges 20 and 21. When the tire is mounted on the rim the beads 15 and 16 are seated respectively on the bead seats 18 and 19 adjacent the side flanges 20 and 21.

In the present example the annular seating surface of the seats 18 and 19 extend at a substantial angle, between 10° and 20° and preferably 15°, to the axis of the tire. By utilizing such an extreme angle, the greater portion of the load placed upon the tire is sustained by the reaction of the tire bead with the bead seats, and a minor portion of the load on the tire is sustained by the side flanges of the rim which is convexly curved in section, as shown in Figure 1, and which has a total height of about ½ inch.

The present invention provides a tire bead construction which concentrates the loads placed on the tire at the heel portions of the tire beads. This is done by shaping the tire bead so that it contacts the rim outwardly from a line A, which appears at a point in the drawings at about the center of the tire bead. For the purposes of this discussion the toe of the tire bead is defined as that portion which is axially inwardly from line A and the heel is defined as that portion which is axially outward of line A.

Conventional tire beads are designed so that the toe has a force fit with the bead seat of the rim. In the present invention the bead of the tire is molded so that the toe is positioned radially outwardly (upwardly as viewed in Figure 1) out of contact with the rim seat. Any load which the toe of the bead would normally carry is assumed by the heel of the bead in the present invention and thus the forces of reaction between the heel of the bead and the rim are to this extent intensified. The heel of the bead bears such a concentrated load that the heel is effectively locked to the rim and chafing of the tire bead is virtually eliminated.

The position of line A referred to above is located by reference to the core 22 of the bead, which comprises a plurality of turns of steel wire and comprises the inextensible part of the bead. Practically all the forces which are imposed on the tire by inflation and by load are transferred to the rim through the core 22. These forces are primarily directed outwardly from the core in an axial direction and inwardly in a substantially radial direction. Only a slight proportion of such radial inward forces tend to be transmitted by the core to the rim at points which are axially inward of the core, and this slight proportion is deliberately eliminated in the present invention by molding the toe so that it will not contact the rim. As a practical matter, it is preferred that the line A which marks the inner limit of contact of the bead with the rim should be located approximately in the conical surface, indicated by the line $a$—$a$ in Figure 2, which is tangent to and extends from the axially inner surface of the core to intersect the bead seat at right angles. For best results the line A should not be located axially inwardly of the surface $a$—$a$ by more than about 0.20 inch; and should not be located outwardly of the surface $a$—$a$ by more than about 0.10 inch. Such a location of the line A insures that the bead will be substantially stressed at every point of contact with the rim.

To insure a tight fit of the bead with the rim, the diameter of the heel portion of the bead is molded to a slightly smaller diameter, about 0.187 inch, than the corresponding portion of the bead seat upon which it rests. In the present example where the bead seat has an angle of about 15°, the heel portion of the bead is preferably molded to the same angle. It is obvious, of course, that the advantages of the present invention can be obtained with rims of different seat angles and in such case the angle of the bead would be correspondingly altered to fit the rim.

The invention is particularly adapted to use with tubeless truck tires where a relatively large number of plies are used to give strength and long life to the tire and where such plies necessarily result in a bulky and massive bead construction. Chafing of the bead toes tends to be severe in such tires but it is eliminated by utilizing the bead design of the present invention. The gap 23 which is defined by the lifted toe, as shown in Figure 1, is not objectionable with tubeless tires for there is no tube entering the gap to be pinched and destroyed.

Various modifications in the invention will no doubt occur to those skilled in the art without departing from the spirit and scope of the invention, the essential features of which are summarized below.

I claim:

The combination of a rim and a pneumatic tire mounted thereon, said rim having conical bead seats the surfaces of which extend at an angle of 10°–20° to the axis of said rim, said bead seats terminating at radial side flanges, said tire having a body comprising a plurality of rubberized fabric plies whose cords are wrapped about and anchored to substantially inextensible metallic cores forming tire beads which seat on said annular bead seats adjacent said flanges, respectively, said beads having toe portions respectively, extending inwardly in an axial direction from surfaces substantially tangent to the inner sides of said cores and perpendicular to the bead seats and having heel portions extending outward in an axial direction from said surfaces and at an angle substantially equal to the angle of said bead seats, the toe portions of said beads being out of contact with said bead seats, and said heel portions having a tight compression fit with said bead seats, and bearing against said flanges whereby the forces of reaction between said tire and said rim are transmitted to said rim solely by said heel portions of said beads.

References Cited in the file of this patent

UNITED STATES PATENTS 1,822,320  Shoemaker _____ Sept. 8, 1931

FOREIGN PATENTS 1,032,003  France _____ Mar. 25, 1953